No. 799,629. PATENTED SEPT. 19, 1905.
J. A. BRYANT.
TIRE BOLTING MACHINE.
APPLICATION FILED JAN. 13, 1905.
3 SHEETS—SHEET 2.
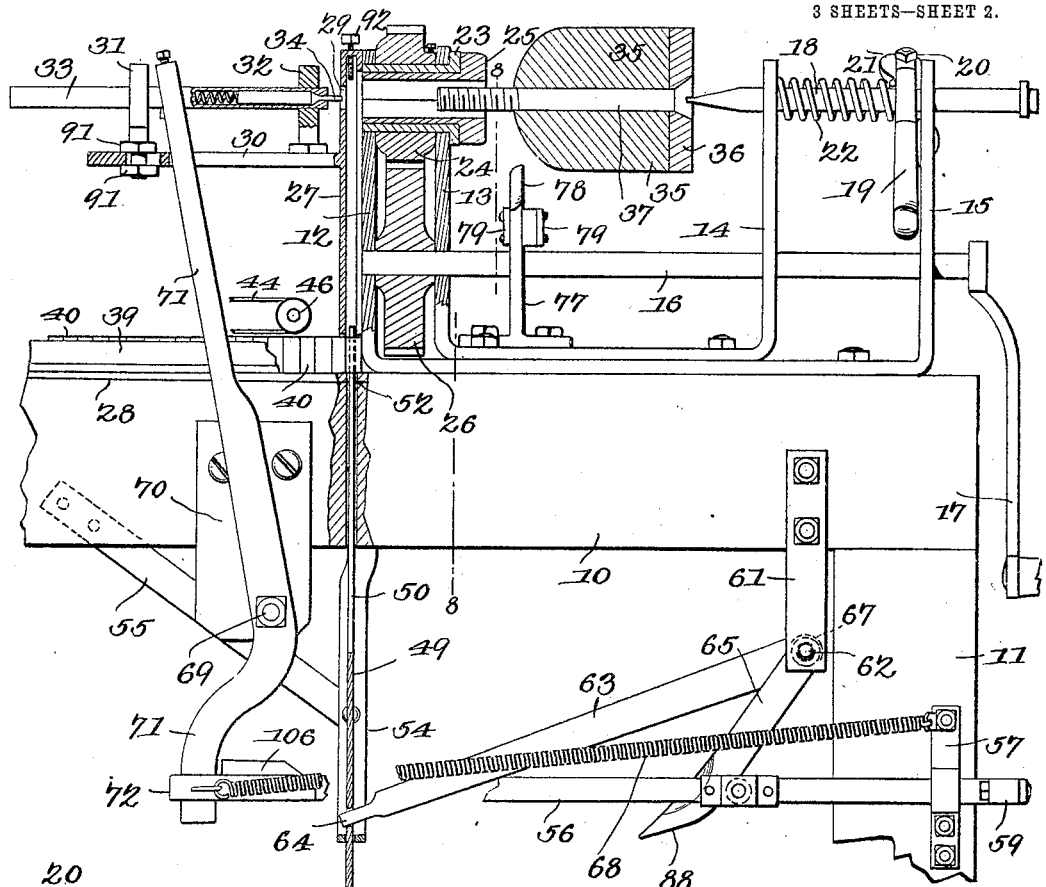
Fig. 7.
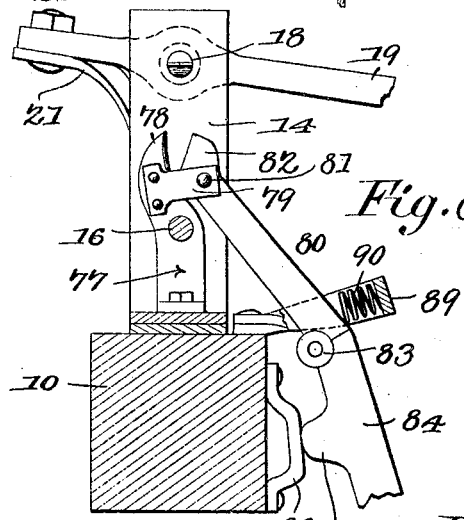
Fig. 8.
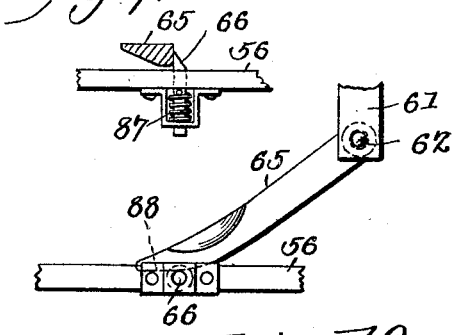
Fig. 9.
Fig. 10.
Witnesses
E. F. Hewit
C. H. Woodward.
John A. Bryant, Inventor.
by C. A. Snow & Co.
Attorneys

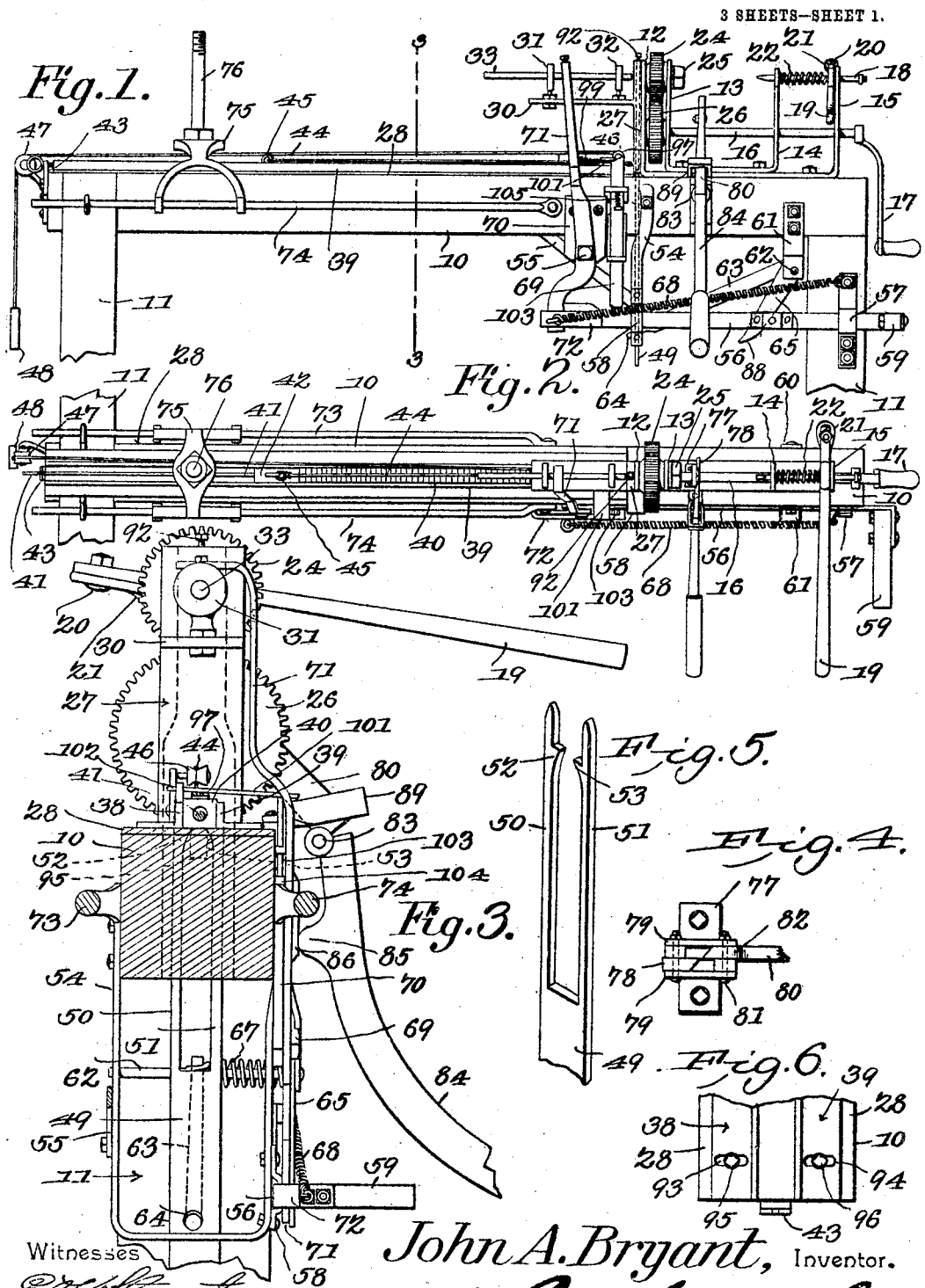

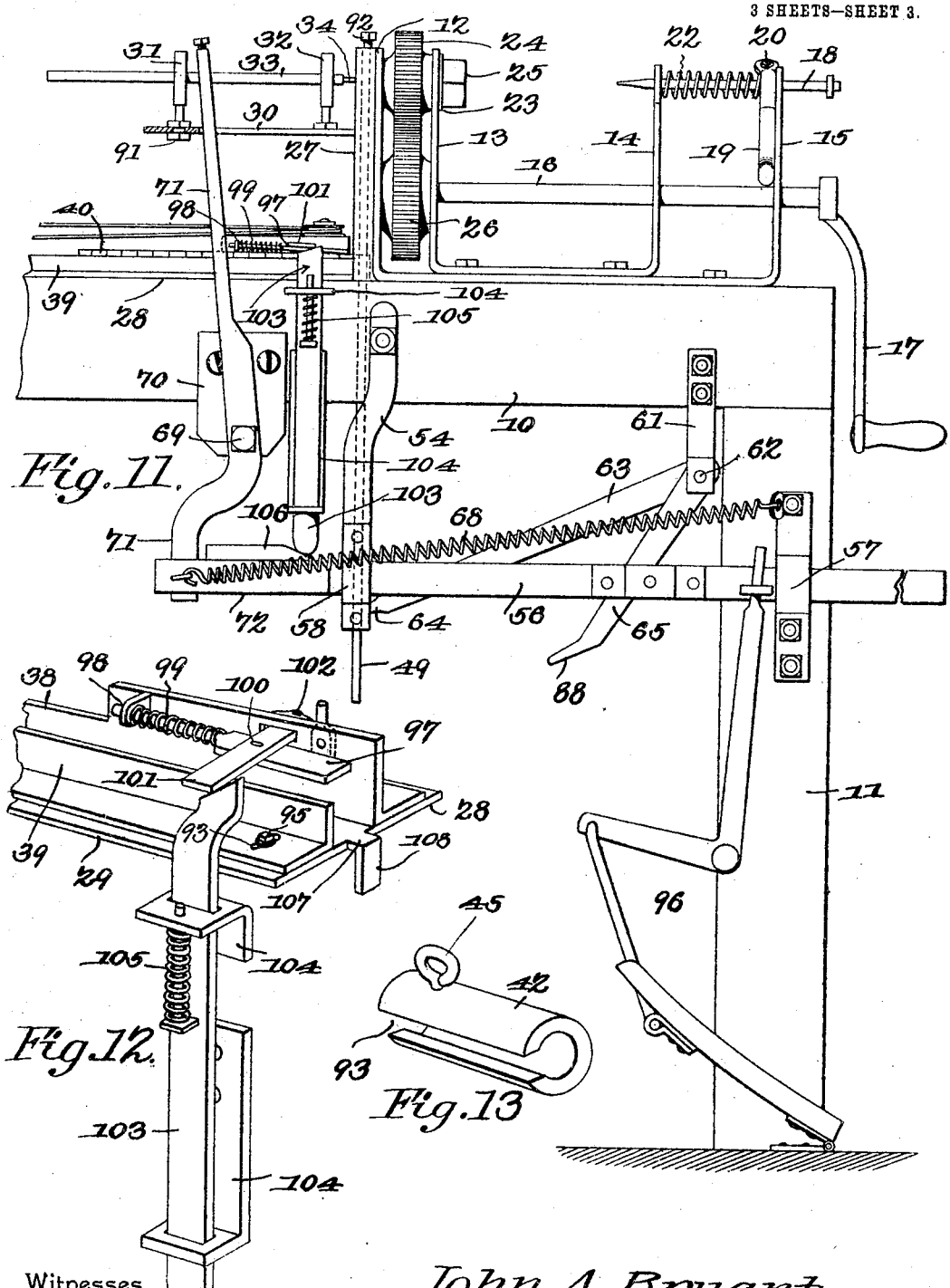

UNITED STATES PATENT OFFICE.

JOHN A. BRYANT, OF PINE VILLAGE, INDIANA.

TIRE-BOLTING MACHINE.

No. 799,629.     Specification of Letters Patent.     Patented Sept. 19, 1905.

Application filed January 13, 1905. Serial No. 240,951.

*To all whom it may concern:*

Be it known that I, JOHN A. BRYANT, a citizen of the United States, residing at Pine Village, in the county of Warren and State of Indiana, have invented a new and useful Tire-Bolting Machine, of which the following is a specification.

This invention relates to machines for applying nuts to bolts and holding the bolts while the nuts are being applied, and has for its object to produce a simply-constructed device of this class efficient in action, easily operated, and adapted for adjustment to various sizes of nuts and bolts.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a side elevation, and Fig. 2 is a plan view, of the improved machine. Fig. 3 is a transverse section, enlarged, on the line 3 3 of Fig. 1. Fig. 4 is a plan view, enlarged, of the "head" portion of the bolt-severing shears. Fig. 5 is a perspective view of the operative end of the nut-feeding shuttle. Fig. 6 is a plan view of the rear end of the bed-frame and of the nut-holding magazine. Fig. 7 is a longitudinal sectional view, enlarged, of the head end of the machine. Fig. 8 is a transverse section on the line 8 8 of Fig. 7, illustrating the construction and operation of the bolt-clipping mechanism. Figs. 9 and 10 are detail views illustrating the construction and action of the shuttle-operating mechanism. Fig. 11 is a view similar to Fig. 1, illustrating some modified features of the construction. Fig. 12 is an enlarged detail perspective view of a portion of the nut-feeding mechanism. Fig. 13 is an enlarged perspective view of the follower member.

The improved device is designed more particularly for "setting" the nuts upon the tire-bolts of vehicle-wheels, and is shown applied to a machine employed for this purpose for illustration, but is not necessarily limited thereto, as will be obvious. The construction thus employed for illustrating the embodiment of the invention comprises a bed-frame 10 of suitable size, mounted upon legs 11. At one end of the frame 10 a head member is connected comprising spaced standards 12, 13, 14, and 15 and carrying an operating-shaft 16, provided with a crank 17 for rotating the same. Mounted for longitudinal movement in the standards 14 15 is a rod 18, operative by a lever 19, pivoted at 20 to a bracket 21, extending from the standard 15 and provided with a spring 22 to maintain the rod yieldably in withdrawn position. The rod 18 is designed to be pressed by the movement of the lever 19 against the head of the bolt to hold the same stationary while the nut is being applied thereto, a section of vehicle-felly 35, tire 36, and a tire-bolt 37 being shown in Fig. 7 to illustrate the operation. Mounted for rotation in the standards 12 13 is a sleeve 23 and carrying a gear-pinion 24 exteriorly thereof and with a square interior for receiving the nut-socket 25. The shaft 16 is provided with a gear-wheel 26, engaging with the pinion 24, so that the rotation of the shaft will also rotate the sleeve 23 and socket 25. The interior of the socket 25 corresponds to the nut to be applied to the bolt and is easily detachable to permit sockets of different sizes for different sizes of nuts to be attached to the machine. Attached to the outer face of the standard 12 is a guideway 27, conforming interiorly to the nuts and terminating at the lower end upon a plate 28, extending longitudinally of the frame 10 and with the upper end of the guideway opposite the intake end of the socket 25, the "guideway" having an aperture 29 in its outer face in alinement with the socket. Extending from the guideway 27 is a horizontal arm 30, carrying standards 31 32, through which a needle member 33 is slidably disposed, the needle having a spring-operated pin 34 projecting from its inner end. The nuts are fed into the lower end of the guideway 27 and thrust upward therein until they are opposite the entrance to the socket 25, when the needle member 33 will be moved longitudinally in the standards 31 32 and passing through the apertures 29 will cause the pin 34 to enter the threaded aperture in the nut, and the inner end of the needle member will then bear upon the nut and thrust it into the socket and against the inner end of the bolt 37 for threading upon the same, as hereinafter explained. The needle-standard 31 is adjustable longitudinally of the arm 30, as by clamp-nuts 91, to provide for any required adjustment, and the guideway 27 is provided with an adjusting-screw 92 in its upper end to control the upward position of the nut which is elevated by the shuttle. Thus by means of the adjusting-bolt 92 the limit of the upward movement of the nuts will be controlled, so that the threaded aperture of the same will be disposed exactly opposite the center of the socket 25, no matter what the size of the socket or nut may be, or, in other words, the adjusting-screw 92 provides for adapting the device for the various sizes of nuts or for slight variations in the sizes of the same grade of nut.

The adjusting members 91 provide means for the vertical adjustment of the standard 31, so that the needle members 33 34 may be maintained in proper alinement relative to the socket 25, as will be obvious.

Attached to the bed-plate 28 are L-shaped members 38 39, forming a magazine or guide for the nuts and terminating at the entrance to the guideway 27, so that the nuts will be fed thereto consecutively.

The nuts (represented at 40) are first placed upon a wire core 41, and the plurality of nuts thus arranged, together with the wire core, placed in the "magazine," with the outer end of the wire attached to a stop-plate 43 to prevent longitudinal movement to the wire, care being taken that the free end of the wire shall stop short of the entrance to the guideway 27, so that the last nut shall be free of the wire core. A "follower" 42 is then placed upon the core-wire in the rear of the series of nuts, the follower having a longitudinal opening 93 to permit it to be so placed and also provided with an eye 45. A cable 44 is connected by one end to the eye 45 of the follower and carried thence over guide-pulleys 46 47 to a weight 48 to provide a tension to the nuts and maintain them pressed against the lower end of the guideway to keep the last nut of the series at all times in proper position to be acted upon by the feeding mechanism.

The nut-feeding mechanism consists of a "shuttle" 49, mounted for movement vertically through the frame 10 and into the guideway 27 and provided with spaced resilient arms 50 51, having inwardly-extending shoulders 52 53 near their free ends. The space between the arms 50 51 is just sufficient to receive the nuts 40 one at a time as the shuttle is operated. The shuttle member is thinner than the nuts 40 and moves upward and downward past the inner end of the plate 28, the latter formed with a tongue 107, extending into the space between the resilient arms 50 51 and narrow enough to permit the shoulders 52 53 to pass it at the downstroke of the plunger, the tongue extending downwardly, as shown at 108, far enough to prevent the shoulders from passing beneath the tongue. Thus as the shuttle is moved upward the shoulders 52 53 pick up the last or inner nut of the series and carry it upward into position opposite the socket 25, and as soon as the shoulders 52 53 pass above the series of nuts the pressure created by the weight 48 will thrust the next nut into position within the guideway 27 and between the resilient arms 50 51. After the needle member 33 has acted and removed the nut which has been supported by the shoulders 52 53 the shuttle is returned to its downward position, and as the inclined lower faces of the shoulders reach the nut which has been thrust forward to replace the one just elevated the resilient arms will yield laterally and the shoulders will pass by the nut and take position beneath it ready for the next action. Thus one nut will be "picked off" and elevated to position opposite the socket 25 at each stroke of the shuttle. The lower end of the shuttle is guided by a bracket 54, attached to the frame 10 and suitably braced, as at 55. The mechanism shown for operating the shuttle consists of a bar 56, mounted for longitudinal movement through keepers 57 58, attached, respectively, to one of the legs 11 and the bracket 54 and provided upon the outer end with a lateral arm 59, against which the knee or leg of the operator may be thrust to operate the bar, or it may be operated by a foot-treadle mechanism, as at 96 in Fig. 11, as may be preferred. Supported for rotation, as by hangers 60 61 from the frame 10, is a shaft 62, carrying an arm 63 at one point thereon and terminating in a stud 64, passing through an aperture in the shuttle 49, and with another and shorter arm 65 extending for engagement by a stud 66, yieldably supported in projected position by a spring 87. the free end of the arm 65 being formed with an inclined portion 88 to assist in the action, as hereinafter shown.

The shaft 62 is provided with a spring 67, operating to maintain the arms 63 and 65 yieldably in their downward positions, and a spring 68 is also attached to the bar 56 to maintain the same yieldably in withdrawn position.

Pivoted at 69 to a hanger 70, depending from the base member 10, is a lever 71, one end of the lever attached to the needle member 33 and the other end extending through a relatively long loop 72 at the free end of the bar 56, the loop permitting a certain degree of "lost" motion between the arm and lever, the object to be hereinafter explained.

Attached to the bed member 10 at opposite sides are guide-rods 73 74, upon which a bracket 75 is slidably disposed and provided with a vertical stud 76 to provide a central support for the hub of the wheel in whose felly and tire the bolts are to be placed. The bracket and its stud, being adjustable upon the guide-rods, are readily adaptable to the various sizes of wheels to be operated on. Mounted for longitudinal movement above the magazine for the supply of the nuts 40 is an arm 97, slidable through a guide 98, attached to the magazine member 38, and provided with a spring 99 for maintaining the arm yieldably in projected position. Pivoted at 100 to the arm 97 is a lever 101, which is pivoted in turn at 102 to the member 38 and projects by its free end into the path of a vertically-moving bar 103. The bar 103 is supported in guides 104 on the frame 10 and provided with a spring 105 to maintain the same yieldably in its downward or withdrawn position. The upper end of the bar 103 is inclined for engaging the free end of the lever 101 and swinging it laterally upon its pivot 102, and thereby throwing the yieldable bar 97 rearwardly.

Attached to the operating-bar 56 is a cam-rib 106, adapted to hold the bar 103 in elevated position and maintain the arm 97 in withdrawn position during the time the operating-bar 56 is in withdrawn position. The cam-rib 106 will be so disposed that it will pass beneath the bar 103 and lower it, and thus release the member 97 just after the shuttle begins its upward stroke, so that the member 97 will be caused to follow the outermost nut of the series into the space between the resilient arms 50 51 just as soon as the shuttle has picked off the nut which it is desired to elevate and hold the next nut from being moved by the shuttle in its operation. The nut, which for the time being is held in the shuttle below the shoulders 52 53, is thus effectually supported and held from "jumping" or displacement by the movement of the shuttle. At the return movement of the bar 56 the cam-rib 106 again passes beneath the bar 103 and withdraws the member 97 and holds it withdrawn until the next stroke of the shuttle. Attached to the base portion of the head member is a standard 77, having a shearing-jaw 78 upon the upper end and preferably with the shaft 16 passing through it to assist in supporting the standard. The standard is also provided with spaced plates 79, between whose free ends an arm 80 is pivoted at 81 and provided with an opposing shear-jaw 82 for coaction with the shear-jaw 78. Pivoted at 83 in the lower end of the arm 80 is a lever-arm 84, having a lateral projection 85 for bearing upon a plate 86, attached to the base member 10. Embracing the lever-arm 84 is a keeper or guard 89, in which a spring 90 is inclosed, and bearing upon the lever-arm to hold the same yieldably in its depressed or inactive position, and thus hold the jaws 78 82 separated when not in use. By this arrangement it will be obvious that the depression of the free end of the lever-arm 83 will cause the projection 85 to serve as a fulcrum to the lever 84 and cause the requisite action of the arm 80, and thus actuate the jaw member 81 against any object held between the opposing jaws, the whole forming an effective shearing mechanism, whereby the surplus ends of the bolts 37 may be severed after the nuts are applied.

The magazine may be of any desired length for holding any required number of the nuts.

With a machine thus constructed the operation is as follows: The wheel being placed upon the stud 76 and the latter adjusted to bring the felly 35 and tire 36 in proper position relative to the holding member 18 and socket 25, a bolt 37 is placed through the tire and felly and its threaded end inserted into the free end of the socket 25. The operator then moves the lever 19 to cause the holding member 18 to bear against the head of the bolt and press the felly against the adjacent end of the socket 25. The operator then presses with the knee or leg upon the arm 59 or upon the treadle 96, as the case may be, and operates the bar 56 and causes the pin 66 to engage the arm 65 and rotate the shaft 62, and at the same time cause arm 63 to elevate the shuttle 49 and carry the nut engaged by the shoulders 52 53 to position opposite the entrance to the socket 25, the stop mechanism 97 101 being also operated, as before described. The parts will be so proportioned and disposed that the stud 66 will reach the inclined portion 88 of the arm 65 when the shuttle has been elevated to its highest point, and by that time the inclined portion will be in a horizontal position or parallel to the line of travel of the pin 66, so that the further movement of the pin will not move the arm 65, and thus hold the shuttle stationary and in its elevated position for a time. At the first portion of the stroke of the bar 56 the elongated bearing 72 will be moving past the lower end of the lever 71, so that the needle member 33 will be inoperative until the shuttle has fully elevated the nut. The stud 66 will have reached the outer end of the inclined portion 88 just as the inner end of the bearing 72 engages the lever 71, so that the spring-pin 34 of the needle member 33 will pass through the aperture 29 in the guideway 27 and pick up the nut just before the pin 66 passes from beneath the arm 65 and releases the shuttle and permits the spring 67 to move it downward into its former position. In the meantime the continued movement of the bar 56 causes the needle member to carry the nut into the socket 25 and press it against the end of the bolt 37, the yielding pin 34 when it engages the bolt withdrawing into the needle member, leaving the latter free to be pressed against the nut, which will then be rotated and turned "home" upon the bolt by rotating the socket through the action of the handle. As soon as the nut is well started upon the bolt the knee-operated bar can be released and the spring 68 permitted to restore the bar to its former position, this action likewise restoring the needle member to its outward position and the stop member 97 to its former position. At the return movement of the bar 56 the arm 65 will compress the spring-supported stud 66 and pass it, and the latter will be automatically returned to its former position. After the nut has been set home the lever 19 is released and the wheel tilted to bring the bolt into position between the shear-jaws 78 82 and the lever 84 operated to sever the surplus ends of the bolt. The operation is then repeated for all the bolts of the wheel, and by simply adjusting the bracket 75 and its stud 76 along the guide-rods 73 74 both sizes of the wheels of the vehicle may be operated upon with equal facility or any other desired size operated upon, as will be obvious.

The guide members 38 39, forming the magazine for the nuts, will be adjustable laterally, as by slots 93 and 94 and clamp-bolts 95 and 96, as shown in Fig. 6, to adapt the device to different-sized nuts, so that by providing a plurality of the guideways 27, sockets 25, and shuttles 49 of different sizes for the different sizes of nuts the same machine may be adapted for all sizes of nuts and bolts usually employed.

While the machine is more particularly adapted for applying the nuts to vehicle-wheels, the same may be applied by making slight and immaterial modifications to various structures wherein it is desired to attach nuts to bolts, and I do not, therefore, desire to be limited in any manner in the purposes for which the machine shall be employed.

The machine can be inexpensively manufactured and operates efficiently for the purposes described.

Having thus described the invention, what is claimed is—

1. In a device of the class described, a wrench-head mounted for rotation and open at the ends for the passage of the nuts therethrough, means for supporting a bolt with its threaded end within one end of said wrench-head, means for inserting a nut into the opposite end of said wrench-head for engagement with said bolt, and means for rotating said wrench-head.

2. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, means for thrusting the nuts consecutively through said guideway, means for transferring the nuts from said guideway to said wrench-head and engaging them with the bolt therein, and means for rotating said wrench-head.

3. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, means for thrusting the nuts consecutively through said guideway, a needle member mounted for movement through said guideway and into said wrench-head for transferring the nuts from said guideway to said wrench-head and engaging them with the bolt therein, and means for rotating said wrench-head.

4. In a device of the class described, a socket mounted for rotation, a wrench-head detachably connected in said socket and partaking of its movement and open at the ends for the passage of nuts therethrough, means for supporting a bolt with its threaded end within one end of said wrench-head, means for inserting a nut into the opposite end of said wrench-head for engagement with the bolt therein, and means for rotating said socket and the wrench-head carried thereby.

5. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a magazine for the nuts communicating with said guideway, means for carrying the nuts consecutively from said magazine through said guideway, means for transferring said nuts consecutively from said guideway to said wrench-head and engaging them with the bolt therein, and means for rotating said wrench-head.

6. In a device of the class described, a supporting-frame, a socket mounted for rotation in said frame, a wrench-head detachably connected to said socket and partaking of its motion and open at the ends for the passage of the nuts therethrough, a rod supported for longitudinal movement in said frame for bearing upon a bolt and holding the same with its threaded end within one end of said wrench-head, means for inserting a nut into the opposite end of said wrench-head and engaging it with the bolt therein, and means carried by said frame for rotating said socket and the wrench-head carried thereby.

7. In a device of the class described, a supporting-frame, a shaft mounted for rotation, in said frame and carrying a gear-wheel, a socket mounted for rotation in said frame and carrying a gear-pinion for engagement with said gear-wheel, a wrench-head detachably connected in said socket and partaking of its motion and open at the ends for the passage of the nuts therethrough, means for supporting a bolt with its threaded end within one end of said wrench-head, means for inserting a nut into the opposite end of said wrench-head for engagement with the bolt therein and threaded thereon when said shaft is rotated.

8. In a device of the class described, a supporting-frame, a shaft mounted for rotation in said frame and carrying a gear-wheel, a socket mounted for rotation in said frame and carrying a gear-pinion for engagement with said gear-wheel, a wrench-head detachably connected in said socket and partaking of its motion and open at the ends for the passage of the nuts therethrough, means for supporting a bolt with its threaded end within one end of said wrench-head, a guideway for the nuts disposed at the opposite end of said wrench-head and communicating therewith, means for causing the nuts to pass consecutively into said guideway, a needle mounted for operation through said guideway for transferring the nuts therefrom to said wrench-head and engaging them with the end of the bolt therein, whereby the nuts will be threaded upon said bolt when said shaft is rotated.

9. In a device of the class described, a wrench-head mounted for rotation and open at the ends for the passage of the nuts therethrough, means for supporting a bolt with its threaded end within one end of said wrench-head, a guideway for the nuts disposed at the opposite side of said wrench-head and provided with a transverse aperture in alinement therewith, means for causing the nuts to pass consecutively into said guideway, a needle mounted for movement through said guideway-aperture and into said wrench-head and having a spring-controlled pin extending in advance thereof for passage through the threaded aperture of the nut supported in said guideway.

10. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a magazine for the nuts communicating with said guideway, means for feeding said nuts consecutively from said magazine into said guideway, a shuttle operating in said guideway for consecutively moving said nuts into position opposite said wrench-head, means for operating said shuttle, means for consecutively transferring said nuts from said guideway to said wrench-head and engaging the same with the bolt therein, and means for rotating said wrench-head.

11. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a magazine for the nuts communicating with said guideway, means for feeding said nuts consecutively from said magazine into said guideway, a shuttle operating in said guideway for consecutively moving said nuts into position opposite said wrench-head, means for operating said shuttle, a needle member disposed for movement through said guideway and into said wrench-head for transferring the nut engaged by said shuttle to said wrench-head, means for operating said needle, and means for rotating said wrench-head.

12. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a magazine for the nuts communicating with said guideway, means for feeding said nuts consecutively from said magazine into said guideway, a shuttle operating in said guideway for consecutively moving said nuts into position opposite said wrench-head, a bar mounted for movement by the operator and provided with a laterally-extending spring-supported pin, a transverse shaft mounted for oscillation and having one arm extending for movable connection to said shuttle and with another arm for engagement by said spring-pin in said bar, means for consecutively transferring said nuts from said guideway, and means for rotating said wrench-head.

13. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a magazine for the nuts communicating with said guideway, means for feeding said nuts consecutively from said magazine into said guideway, a shuttle operating in said guideway for consecutively moving said nuts into position opposite said wrench-head, a bar mounted for movement by the operator and provided with a laterally-extending spring-supported pin, a transverse shaft mounted for oscillation and having one arm extending for movable connection to said shuttle and with another arm for engagement by said spring-pin in said bar, a needle member mounted for movement through said guideway and into said wrench-head, connecting means between said needle member and bar, and means for rotating said wrench-head.

14. In a device of the class described, a supporting-frame, a shaft mounted for rotation in said frame and carrying a gear-wheel, a socket mounted for rotation in said frame and carrying a gear-pinion for engagement with said gear-wheel, a wrench-head detachably connected in said socket and partaking of its motion and open at the ends for the passage of the nuts therethrough, means for supporting a bolt with its threaded end within one end of said wrench-head, a guideway for the nuts disposed at the opposite side of said wrench-head and provided with a transverse aperture in alinement therewith, a needle member mounted for movement through said guideway-aperture and into said wrench-head, a magazine for the nuts communicating with the guideway, means for feeding the nuts consecutively from said magazine into said guideway, a shuttle operating in said guideway for consecutively moving the nuts into position opposite said wrench-head, a bar mounted for movement by the knee of the operator and provided with a spring-controlled lateral pin, a transverse shaft carrying one arm for coupling to said shuttle and with another arm for engaging said lateral pin, and a lever intermediately pivoted with one end coupled to said needle member and the other end operated by the action of said knee-bar.

15. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a magazine for the nuts communicating with said guideway, a follower within the magazine in the rear of the nuts therein, means for causing said follower to bear with a constant pressure upon said nuts, a shuttle operating in said guideway for consecutively moving the nuts as they are fed from the magazine into position opposite said wrench-head, means for operating said shuttle, and means for consecutively transferring said nuts from said guideway to said wrench-head.

16. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a magazine for the nuts communicating with said guideway, a rod upon which the nuts are threaded and supported detachably within said magazine, a follower within the magazine in the rear of the nuts therein, means for causing said follower to bear with a constant pressure upon said nuts, a shuttle operating in said guideway for consecutively moving the nuts as they are fed from the magazine into position opposite said wrench-head, means for operating said shuttle, and means for consecutively transferring said nuts from said guideway to said wrench-head.

17. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a magazine for the nuts communicating with said guideway, means for consecutively feeding said nuts from said magazine into said guideway, a shuttle operating in said guideway and formed with spaced resilient sides, means for operating said shuttle, means for transferring the nut carried by said shuttle into said wrench-head, and means for rotating said wrench-head.

18. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a needle member mounted for movement through said guideway and into said wrench-head, a magazine for the nuts communicating with said guideway, means for feeding the nuts consecutively from said magazine into said guideway, a shuttle operating in said guideway for moving said nuts consecutively therein, a bar mounted for movement by the knee of the operator and provided with a lateral spring-supported stop-pin and with the free end formed with a longitudinally-extending bearing, a transverse shaft mounted for rotation and having one arm extending for movable connection to said shuttle and another arm for engagement by said spring-pin, a lever intermediately pivoted with one end coupled to said needle member and the other end movably fitting said elongated bearing in said knee-bar, and means for rotating said wrench-head.

19. In a device of the class described, a base member, a supporting-frame upon one end of said base member, a wrench-head open at the ends and mounted for rotation upon said frame, means for supporting a bolt with its threaded end within one end of said wrench-head, a guideway for the nuts disposed at the opposite ends of said wrench-head and communicating therewith, a magazine for the nuts formed of spaced L-shaped bars adjustably connected to said base member and terminating at said guideway, means for feeding the nuts consecutively from said magazine to said guideway, means for moving the nuts consecutively through said guideway, means for transferring said nuts from said guideway into said wrench-head for engagement with the bolt therein, and means for rotating said wrench-head.

20. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a needle member mounted for movement through said guideway and into said wrench-head, a magazine for the nuts communicating with said guideway, means for feeding the nuts consecutively from said magazine into said guideway, a shuttle operating in said guideway for moving said nuts consecutively therein, a bar mounted for movement by the knee of the operator and provided with a lateral spring-supported stop-pin and with the free end formed with a longitudinally-extending bearing, a transverse shaft mounted for rotation and having one arm extending for movable connection to said shuttle and another arm for engagement by said spring-pin and with the free end inclined to the longitudinal plane of the arm, a lever intermediately pivoted with one end coupled to said needle member and the other end movably fitting said elongated bearing in said knee-bar, and means for rotating said wrench-head.

21. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a magazine for the nuts communicating with said guideway, a rod upon which the nuts are threaded and supported detachably within said magazine, a follower formed of a tube having a longitudinal opening along one side for enabling the follower to be positioned upon the rod within the magazine in the rear of the nuts therein, means for causing said follower to bear with a constant pressure upon said nuts, a shuttle operating in said guideway for consecutively moving the nuts as they are fed from the magazine into position opposite said wrench-head, means for operating said shuttle, and means for consecutively transferring said nuts from said guideway to said wrench-head.

22. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a magazine for the nuts communicating with said guideway, a shuttle operating in said guideway and formed with spaced resilient sides and inwardly-extending shoulders, means for operating said shuttle, means for consecutively feeding said nuts from said magazine into the path of said shuttle within said guideway, a stop-bar for yieldably bearing upon the nuts in said magazine and movable longitudinally, means for operating said bar to withdraw the same from the path of said shuttle, means for transferring the nut carried by said shuttle into said socket, and means for rotating said "wrench-head."

23. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a magazine for the nuts communicating with said guideway, a shuttle operating in said guideway and formed with spaced resilient sides and inwardly-extending shoulders, means for operating said shuttle, means for consecutively feeding said nuts from said magazine into the path of said shuttle within said guideway, a stop-bar for yieldably bearing upon the nuts in said magazine and movable longitudinally, a lever operatively engaging said stop-bar, a trip-bar yieldably supported in the path of said lever for operating the same when elevated, means for operating said shuttle, and means for operating said trip-bar.

24. In a device of the class described, a wrench-head mounted for rotation and open at the ends for the passage of the nuts therethrough, means for supporting a bolt with its threaded end within one end of said wrench-head, a guideway for the nuts disposed at the opposite end of said wrench-head and communicating therewith, a magazine for the nuts communicating with said guideway, a shuttle operating in said guideway and formed with spaced resilient sides and inwardly-extending shoulders, means for operating said shuttle, means for consecutively feeding said nuts from said magazine into the path of said shuttle within said guideway, a spring-controlled stop-bar for yieldably bearing upon the nuts in said magazine and movable longitudinally, a lever operatively engaging said stop-bar, a trip-bar movable transversely of the path of said lever, an operating member carrying a cam-rib and mounted for movement transversely of the path of said trip-bar, and connecting means between said operating member and said shuttle.

In testimony that I claim the foregoing as my own I have hereto affixed my signature in the presence of two witnesses.

JOHN A. BRYANT.

Witnesses:
GEORGE I. FENTERS,
WILLIAM A. AMBLER.